Nov. 6, 1962

H. M. TAFT 3,063,039

MAGNETIC DATA STORAGE DEVICE

Filed April 1, 1957

5 Sheets-Sheet 1

INVENTOR

Hugh M. Taft

BY Sughrue & Rothwell

ATTORNEYS

Nov. 6, 1962

H. M. TAFT 3,063,039

MAGNETIC DATA STORAGE DEVICE

Filed April 1, 1957

5 Sheets-Sheet 2

INVENTOR

Hugh M. Taft

BY Sughrue & Rothwell

ATTORNEYS

INVENTOR
Hugh M. Taft
BY Sughrue & Rothwell
ATTORNEYS

Nov. 6, 1962

H. M. TAFT 3,063,039

MAGNETIC DATA STORAGE DEVICE

Filed April 1, 1957

5 Sheets-Sheet 4

INVENTOR

Hugh M. Taft

BY Sughrue & Rothwell

ATTORNEYS

Nov. 6, 1962 H. M. TAFT 3,063,039

MAGNETIC DATA STORAGE DEVICE

Filed April 1, 1957

5 Sheets-Sheet 5

INVENTOR

Hugh M. Taft

BY Sughrue & Rothwell

ATTORNEYS

United States Patent Office 3,063,039

Patented Nov. 6, 1962

3,063,039

MAGNETIC DATA STORAGE DEVICE

Hugh M. Taft, Springfield, Vt., assignor, by mesne assignments, to Ex-Cell-O Corporation, Detroit, Mich., a corporation of Michigan Filed Apr. 1, 1957, Ser. No. 649,984
8 Claims. (Cl. 340—174.1)

This invention relates to improvements in magnetic data storage devices, and more particularly to means for rotatably supporting and driving these devices.

Electronic computers, recorders, and the like, utilize a magnetizable medium for storage of information that is to be saved for future use, such information being transposed into discrete, magnetized code dots on the medium. The dots, or train of dots, may be recorded by a pulse from a transducing head located close to the surface layer of the medium. The medium is commonly a rigid magnetizable surface layer of a body, such as a drum which is rotated at high speed. The rotational speed of such drums makes possible a high pulse packing density, i.e. a high storage capacity per unit area of the medium, limited only by the diffusion pattern of the magnetic pulse proportional to the power input of the transducing heads. The magnitude of this power input is governed by the comparatively great head-to-drum clearance dictated by present design and manufacturing limits. The principal limitations to close head-to-drum spacing are eccentricity between the drum and rotational axes, in combination with out-of-roundness of the co-acting elements, both of which produce objectionable variation in amplitude of the output signals. With a fixed amount of eccentricity this amplitude variation increases with close head-to-drum spacing thus making it particularly important to reduce or eliminate the eccentricity. This invention eliminates the factor of eccentricity by combining the recording and journal surfaces and supporting the magnetizable member on pressurized gas lubricated bearings.

An object of this invention is to provide a magnetic data storage device having a rotatable magnetizable member with transducing heads mounted to provide a minimum head-to-drum clearance. This is accomplished by journalling means for the drum which eliminate eccentricity, and more particularly by a construction wherein the perimeter of a conical shaped drum provided with such said magnetizable layer forms the journal portion of a pressurized gas lubricated bearing.

An additional object is to provide means to adjust and control the clearance between the surface of the magnetizable member and its bearing and associated magnetic transducer heads.

Another object of this invention is to provide a compact driving arrangement for the magnetizable member.

It is also an object to provide a magnetizable member for a magnetic data storage device which will be simple to machine as the magnetizable surface is also the journal surface.

Further objects and advantages of the invention will be apparent from the following description and accompanying drawings wherein.

Figure 1:
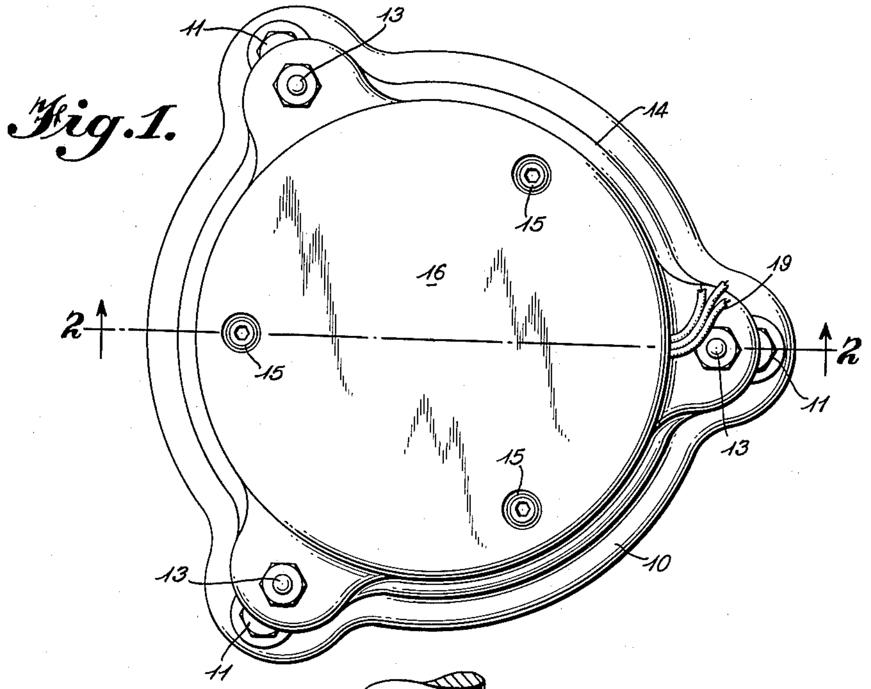
FIGURE 1 is a top plan view.
Figure 2:
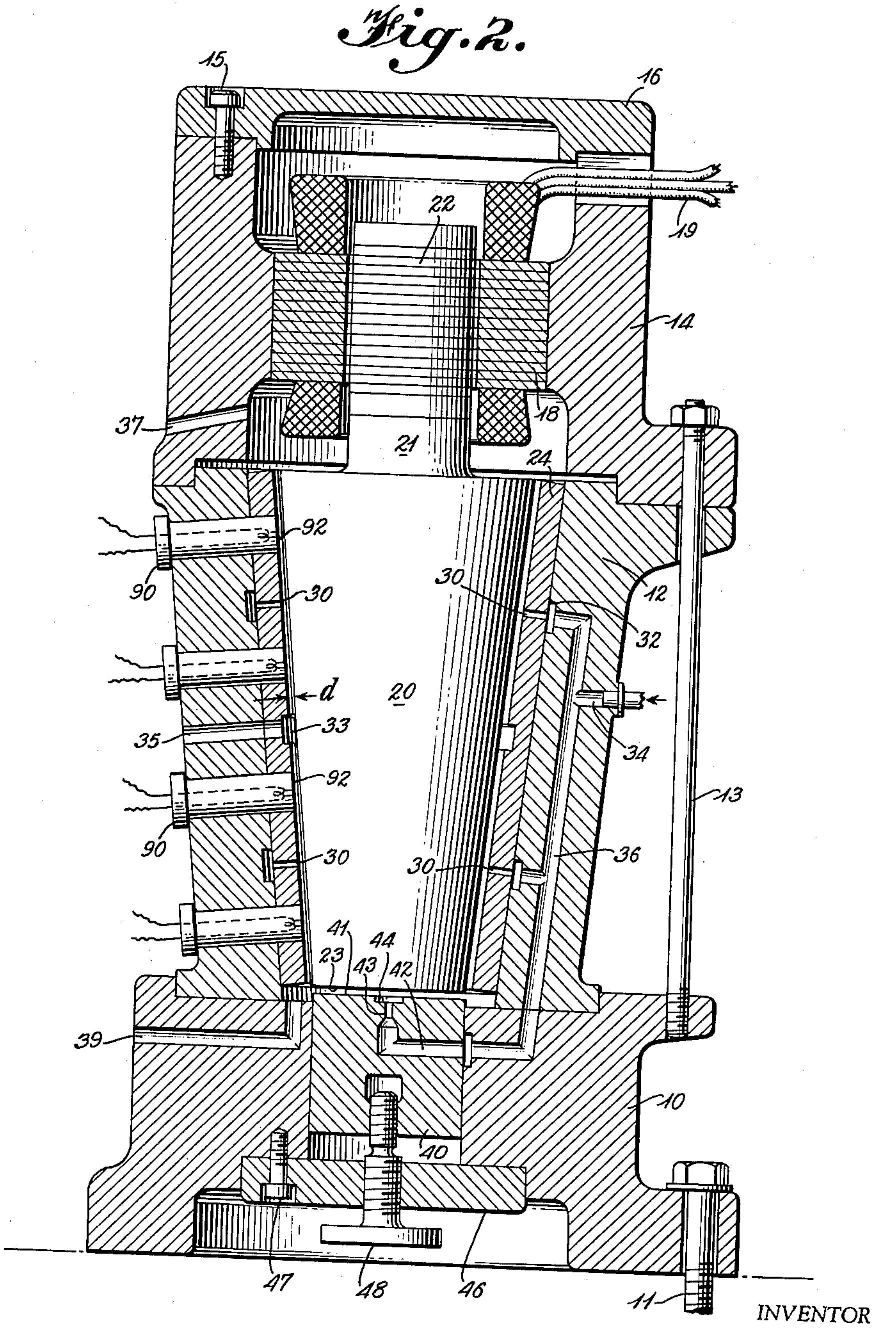
FIGURE 2 is a side elevation sectional view along line 2—2 of FIGURE 1 showing an embodiment of the magnetic data storage device.

Referring to the drawings, FIGURES 1 and 2 show the elements of a magnetic storage device with the drum mounted for rotation about a vertical axis. A bracket 10, fastened to a suitable base by means of screws 11, supports a bearing housing 12, which in turn supports a housing 14 for an electric motor stator 18. The members 10, 12 and 14 are aligned by suitable co-acting circular pilots and are held together by tie rods 13. Cap 16 closes the upper access opening to housing 14 and is fastened thereto by screws 15. Power supply lines for the motor are indicated at 19.

A magnetizable member 20 has the form of a frustum of a right circular cone. An integral shaft portion 21 carrying a rotor 22 of the motor extends upwardly from the large end of the frusto conical member 20. The lower and small end of the member 20 has a surface 23 perpendicular to the rotative axis of the drum and this surface 23 forms the runner element of a thrust bearing. The bearing housing 12 has a tapered bore, and a bearing liner 24 is pressed inside this bore. The interior of the liner 24 is formed as a complementary bearing surface for the frusto conical member 20. Suitable electromagnetic transducing heads 90 are mounted in housing 12 and extend through bearing liner 24 with their innermost ends 92 flush with the bearing surface.

The member 20 is rotatably supported both radially and axially in pressurized gas lubricated bearings. An annular groove 33 encircles the sleeve 24 at equal distance from the ends. Located half way between groove 33 and the upper and lower ends of the sleeve are two encircling rows of restricted metering holes 30 in communication with annular grooves 32 in housing 12. Passages 34 and 36 in the housing 12 are also in fluid communication with grooves 32. A gas is supplied at a pressure greater than atmospheric through passages 36 and 34, grooves 32 and holes 30. The gas pressure acting through the holes 30 tends to always hold the journal in concentric relationship to the bearing. The flow of gas is allowed to escape to the atmosphere through passages 35, 37 and 39.

The bearing support also includes a thrust bearing having a runner portion, the surface 23, and a stationary bearing portion, a surface 41. In the center of surface 41 there is a shallow recess 44 connected by a restricted metering hole 43 to passage 42 to which pressurized gas is supplied from passage 36. The flow of pressurized gas through the hole 43 causes a separation between surfaces 23 and 41 to vertically lift and support the member 20 in an axial position commensurate with a pre-determined radial clearance "*d*."

One means for adjusting the radial clearance "*d*" is shown in FIGURE 2. The surface 41, and fluid passages 42, 43 and 44 are contained in a cartridge 40 axially slidable in a central bore of bracket 10. This bore is bridged at its lower end by cap 46 rigidly fastened to bracket 10 by screws 47. Cap 46 has a central threaded hole and the bottom end of cartridge 40 also has a threaded hole, and these holes are threaded with different leads to accommodate a differential screw 48, thus providing means for obtaining a desired delicate axial adjustment of the cartridge 40. The proportioning and adjustment of the described elements should preferably be such that when the system is at rest and the member 20 and surface 23 rest on surface 41 there should still be present a residual clearance between the conical sides of the member 20 and the bearing sleeve 24.

Figure 3:
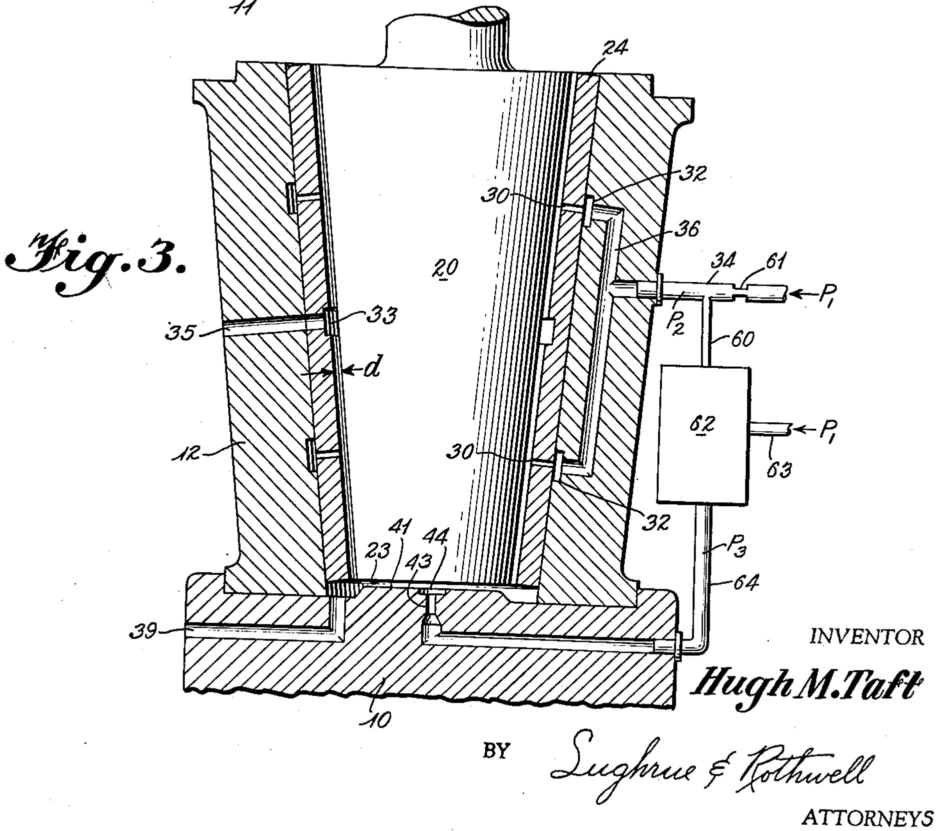
FIGURE 3 is a partial side elevation section of a magnetic data storage device showing a modification thereof.

In FIGURE 3 there is shown a means to automatically adjust the axial position of member 20 to compensate for factors that may cause variations in the radial clearance "*d*." The taper of the frusto conical member 20 may be in the order of 1:10 on the radius, i.e., a change in axial position will produce one-tenth as much change in radial clearance. The initial fit of the drum in the bearings may be such that approximately .0005″ separation between surfaces 23 and 41 of the thrust bearing will give a radial clearance in the order of .0002″ to .0003″ between the tapered journal surface of member 20 and its bearing sleeve 24. The pressurized gas flow through the clearance spaces provides a restoring force when some external force tends to move the drum to an eccentric position, either during rotation or at rest, thus the bearings have a hydrostatic capacity. When pressurized gas is supplied, the drum and rotor assembly instantly moves to its central, freely suspended position. The motor is then energized and the rotatable assembly accelerates. During this period of acceleration there is a gradual increase in the centrifugal stresses and consequent increase in diameter of the drum. Also during this period, and after reaching rotational speed, heat develops from sundry sources, e.g. from the current flow to the electric motor, and from gas film shear or friction in the bearings. The resultant changes in size of various elements due to thermal expansion, can influence the radial clearance "*d*." Although these dynamic conditions would not be considered serious in rotating assemblies having clearances in the order heretofore used, with the very small clearances needed for close head-to-drum spacing these conditions become important.

Assuming that the sum of all the dynamic changes mentioned above results in a decreased radial clearance at a given moment of time, thus causing a decrease in the air flow through all holes 30, then the pressure $P_2$ in the passages downstream from an external restricted orifice 61 will increase. This increased pressure is transmitted as an input signal to a pneumatic amplifier 62 by means of a sensing line 60. The amplifier acts to produce an output signal in the form of an increased pressure $P_3$ in line 64 supplying the thrust bearing causing the member 20 to lift slightly, thus increasing the radial clearance. At this point a new balance of the system is again reached.

In the same way the sum of the dynamic changes may produce an increased radial clearance at a given moment of time. By the reverse of the steps described above the member 20 will drop slightly until the balance of the system is restored as before.

Figure 4:
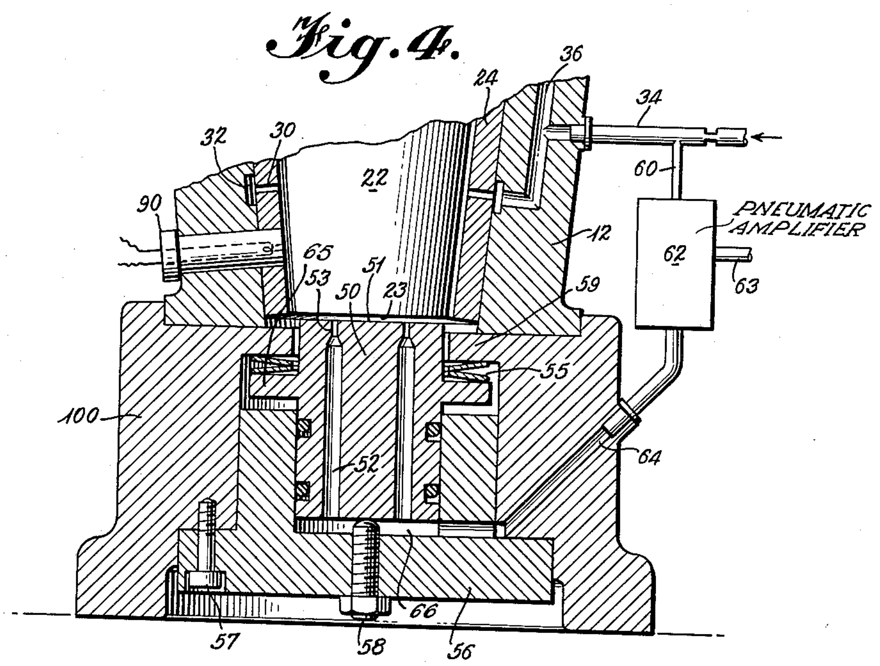
FIGURE 4 is a partial side elevation section of another modification.

Another modification of the thrust bearing is shown in FIGURE 4. The bottom bracket 100 has a central bore containing a flanged cartridge 56 rigidly fastened to the bracket by screws 57. The interior of the cartridge forms a cylinder for a piston 50. A spring 55 is interposed between a flange 59 on bracket 100 and a flange 65 on piston 50 forcing the piston downwards against a stop screw 58. A cavity 66 is supplied with regulated pressurized gas from line 64. The upper face 51 of the piston is the thrust bearing co-acting with surface 23 of the member 20. A series of restricted metering holes 53 are arranged in a circle and are in communication with the pressurized cavity 66 through passages 52. The effect of this arrangement is that the surfaces 51 and 23 are always kept at a predetermined distance, while the piston 50 is physically moved as a result of the function of the system described for FIGURE 3. The stop screw 58 prevents the piston 50 and thereby member 20 from taking a position at rest that would result in physical contact between the perimeter of member 20 and the bearing sleeve 24.

Figure 5:
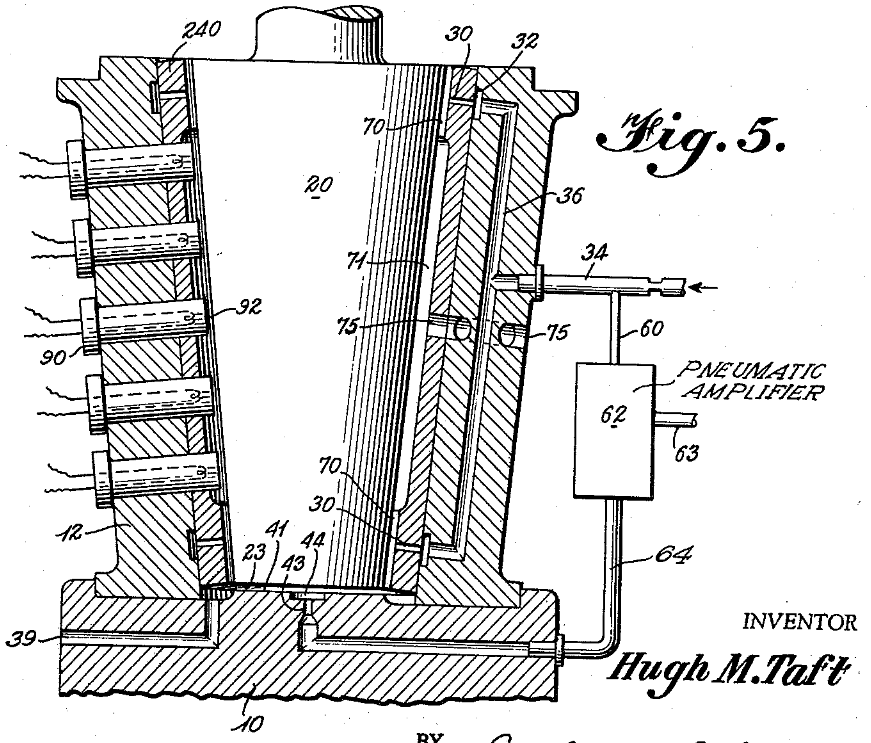
FIGURE 5 is a partial side elevation section of another modification.

A modification in the arrangement of the radial bearings is shown in FIGURE 5. In this modification the bearing zones 70 are limited to the upper and lower ends of a sleeve 240 and are separated by a relieved portion 71 of larger diameter, having a passage 75 to the atmosphere. Otherwise the elements of the bearings are arranged and function as previously described with respect to FIGURE 3. Electromagnetic transducing heads 90 are mounted in the bearing housing 12 with their innermost ends 92 extending into the relieved portion 71 to a position parallel with an imaginary cone established by the bearing portions 70.

Figure 6:
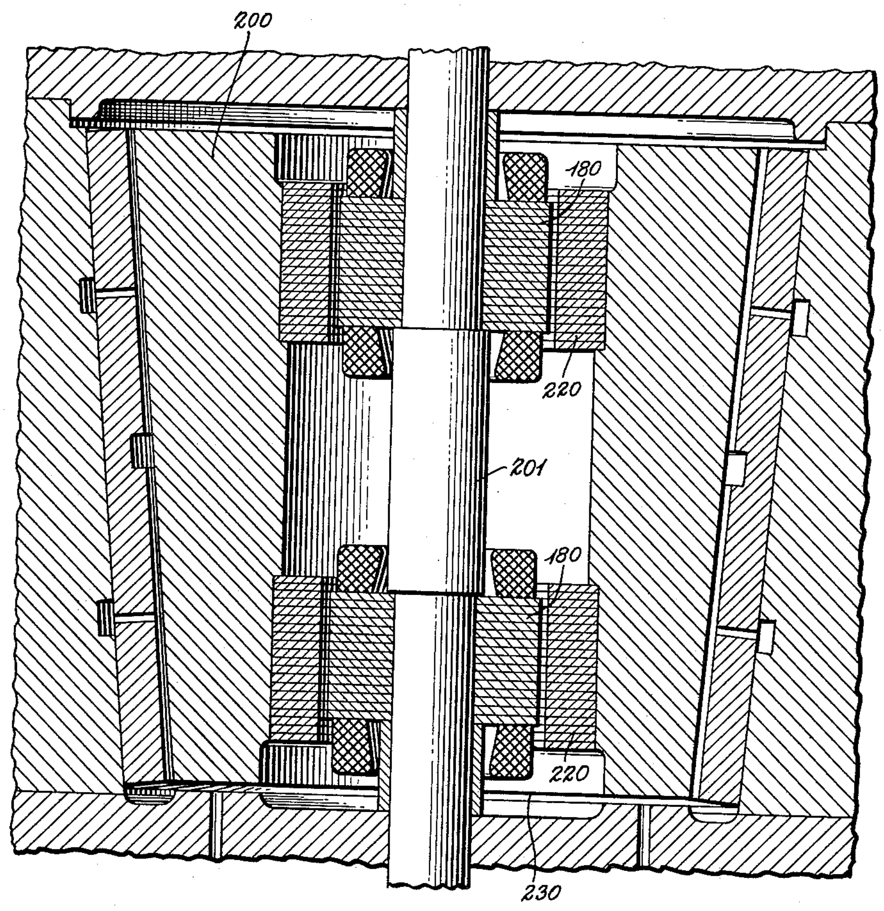
FIGURE 6 is a partial side elevation section illustrating a different arrangement of the driving elements.

FIGURE 6 illustrates another arrangement of the driving elements suitable for drums of large diameter. The member 200 forms a shell having a magnetic layer on its conical outer surface which forms the journal. The interior of the drum is provided with a bore in which is fitted an armature 220 of one or more induction motors. A laminated core 180 with field windings is carried by a fixed shaft 201. One end face of the drum shell forms the journal portion 230 of the thrust bearing.

Figure 7:
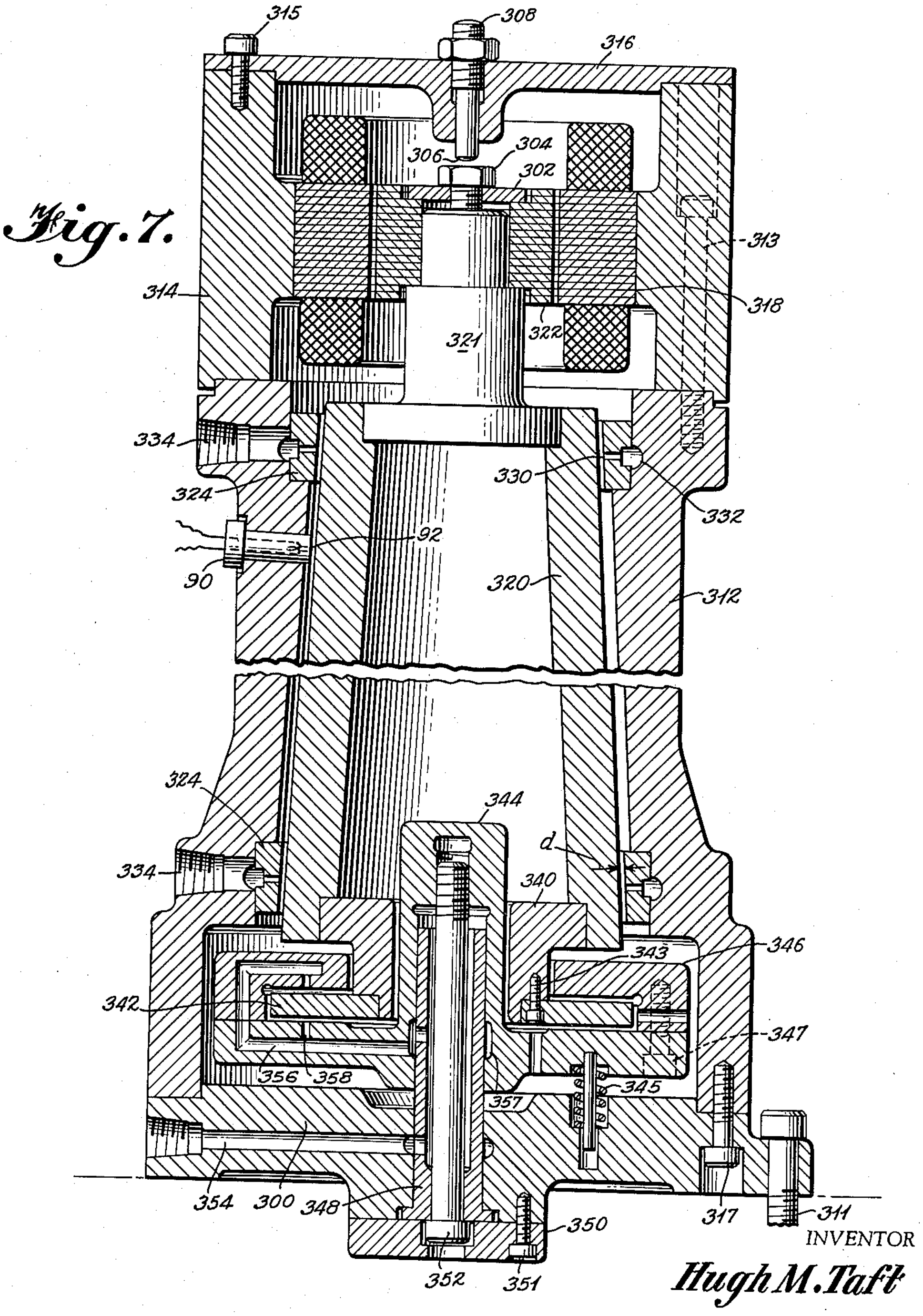
FIGURE 7 is a side elevation sectional view of another modification.

FIGURE 7 illustrates another embodiment of the invention. A bracket portion 300 may be attached to a suitable base by several screws 311. Centrally piloted on the bracket is a bearing housing 312, attached thereto by several screws 317. In the end of the housing 312 opposite the bracket also centrally piloted, is a motor housing 314 attached thereto by several screws 313. This motor housing is closed off at its free end by cap 316 attached thereto by several screws 315. The interior of the motor housing contains the stator 318 of an electric motor. One part of the bearing housing supports the journal bearing means for a rotatable member 320, and another part contains the thrust bearing means for this member. Member 320 is shaped as a frustum of a right circular cone and has a trunnion portion 321 fixedly attached at one end supporting a rotor 322 of the electric motor. The rotor is fitted to a reduced portion of the trunnion and further secured axially between a shoulder on the trunnion and a washer 302 held by a screw 304 threaded into the end of the trunnion. The head of screw 304 forms an abutment for the end portion 306 of a screw 308 threaded and piloted in cap 316. By adjusting and locking screw 308 in a pre-selected position the maximum axial displacement in one direction of the rotatable system may be established. At the other end of member 320 is fixedly attached another trunnion portion 340 supporting at its outwardly directed end a thrust bearing runner 342 secured thereto by several screws 343, and this runner is disc shaped with its two sides facing stationary, parallel bearing portions of a gas lubricated thrust bearing.

The member 320, which preferably is made hollow for the sake of weight saving, has on its circular conical surface a layer of magnetizable material dispersed in a thermosetting vehicle and permanently fused to the body of said member which is of a material having different magnetic characteristics from said surface layer. Alternately magnetizable material may be fused to the member by other means, e.g. spraying and welding or the like. The surface layer formed by any of these methods is then machined to form an unbroken and continuous surface of the desired diametrical dimensions. In the illustrated embodiment, portions of this surface close to the ends of the cone constitute the journal portions for annular bearings 324 supported in housing 312, while the rest of the surface is the recording surface proper. Between the bearings 324 is a relieved clearance portion in housing 312 into which extends the innermost ends 92 of the transducer heads 90. A series of metering holes 330 in communication with annular grooves 332 are supplied with pressurized gas through conduits 334 in a manner and for a purpose described in connection with FIGURES 1 and 2.

In a central bore of bracket 300 is fixedly supported a hollow trunnion 348 secured against axial displacement by a cap 350 attached to the bracket by several screws 351. A threaded bolt 352 has it head shoulder against the outer free end of the trunnion 348 and its threaded portion in engagement with a threaded hole in a thrust bearing box member 344. This member, which is supported for axial movement on the outside of trunnion 348, together with another thrust bearing box member 346 forms a double acting thrust bearing structure, which in cooperation with aforesaid runner 342, axially supports member 320. The members 344 and 346 are secured to each other by several screws 347 and present parallel ring shaped bearing surfaces towards the side planes of said runner. A series of metering holes 358 are arranged in a circle to supply pressurized gas lubricant in the spaces between the bearing and runner planes, with the result, according to known hydrostatic principles, runner 342 is compelled to be positioned centrally between said bearing planes. The metering holes 358 inter-communicate through conduits 356 which are radially extended to an annular groove 357 in communication with the interior of trunnion 348 which is supplied with the pressurized medium through conduit 354.

The thrust bearing box is axially adjustable by turning screw 352 accessible through a hole in cap 350. By this adjustment the rotatable assembly may be bodily displaced longitudinally, and because of the conical shape of member 320 the clearance "*d*" can be varied at will. To stabilize the thrust bearing structure's motion and eliminate backlash in the threads of the transfer elements a series of compression springs 345 are arranged in a circle to bias the thrust bearing box in one direction.

A novel magnetic storage device has been disclosed by the applicant. The journalling and driving arrangements disclosed provide for faster and more accurate transposing of intelligence data to a magnetic storage device and consequent quick access to such recorded data. The applicant has shown and described several embodiments, however, the described embodiments are for illustration only and are not limiting. Other arrangements will be apparent to those skilled in the art, therefore applicant claims full range of equivalents within the scope of the appended claims.

What is claimed is:

1. A magnetic data storage device comprising: a hollow supporting structure; a rotatable member with a body portion shaped as a frustum of a right circular cone journalled in said structure, the surface of said body portion having continuous and unbroken magnetizable layer of different magnetic properties from the rest of said rotatable member; means for rotating said member; radial and axial hydrostatic bearing means, the surface of said body portion forming the journal portion for the radial bearing means; the axial bearing means comprising: a thrust bearing box defining an upper bearing plane and a lower bearing plane; means fastening said bearing box on said structure and allowing said bearing box to be axially adjustable whilst preventing radial and rotary motion of said bearing box; a trunnion fastened to one end of said rotatable member and having its longitudinal axis coinciding with the longitudinal axis of said rotatable member; a disc-like runner member fastened to said trunnion and having an upper face and a lower face substantially parallel to and in special relationship with the upper plane and the lower plane of said bearing box while in operation; and means to introduce pressurized gas into the annular spaces between said upper face and upper plane and between said lower face and lower plane of said runner member and bearing box respectively.

2. A magnetic data storage device comprising: a tapered drum-like rotatable member having two ends and a perimeter side surface therebetween; an unbroken magnetizable surface layer on said side surface; a supporting structure having a tapered bore whose inner surface is adjacent but not touching said side surface; electromagnetic transducer heads embedded in said supporting structure and adapted to record and read magnetic bits of data information on said surface layer; driving means rotating said rotatable member and being applied to one end thereof; supporting means maintaining said rotatable member freely suspended within said supporting structure and comprising means to introduce a pressurized fluid within the space between said side surface and said inner surface for radial support and further comprising means to introduce a pressurized fluid within a thrust bearing means supporting the other end of said rotatable member for axial support; and means adjusting said thrust bearing means axially to establish a predetermined air gap between the pole pieces of said magnetic transducer heads and said magnetizable surface layer.

3. A device as claim in claim 2 in which said rotatable member is radially supported by fluid bearing means comprising one circular row of fluid metering holes disposed on the inner surface of said supporting structure substantially peripherally one end of said rotatable member and another circular row of fluid metering holes similarly disposed on the inner surface of said supporting structure substantially peripherally the other end of said rotatable member.

4. A device as claimed in claim 3 in which the thrust bearing means comprises a disc-like member fastened to the other end of said rotatable member having an upper face and a lower face in substantially parallel planes and substantially perpendicular to the axis of said rotatable member; said disc-like member being enclosed in a bearing box having an inner upper surface and an inner lower surface in planes substantially parallel to said faces of the disc-like member and in spacial relationship therewith; means fastening said bearing box to said supporting structure; and passageways to introduce pressurized lubricating gas into the annular spaces between said disc-like member and said bearing box whereby said disc-like member is caused to float and be suspended on gas film layers.

5. A device as claimed in claim 4 in which the means fastening said bearing box to said supporting structure maintains said bearing box in a fixed radial position but allows a limited amount of axial adjustment whilst preventing rotary motion of said bearing box.

6. A magnetic data storage device comprising: a rotatable member in the shape of a frustum of a right circular cone; a magnetizable surface layer on the perimeter side surface of said rotatable member; a mounting member having a depression therein for rotatably mounting said rotatable member; at least one magnetic transducer embedded in said mounting member and adapted to record, read and erase magnetic bits of information of said magnetizable surface layer; means rotating said rotating member; bearing means rotatably supporting said rotating member within the mounting member; and means adjusting said bearing means axially for limited axial linear movement of said rotatable member relative to said mounting member to establish a predetermined clearance between said magnetic transducer and said magnetizable surface layer.

7. An apparatus for magnetic data storage comprising: a conical rotatable member, said member having a magnetizable surface; a housing for said member, said housing having a cavity therein complementary of said member; a plurality of electromagnetic transducers with their flux emitting ends substantially equally spaced from said magnetizable surface; gas lubricated bearing means for rotatably supporting said conical member, said bearing means comprising a combination of radial bearing means and axial bearing means; and manual adjusting means for axially displacing said conical member to establish a predetermined clearance between the flux emitting ends of the electromagnetic transducers and said magnetizable surface.

8. In a magnetic data storage device comprising a stationary housing, a plurality of magnetic transducer heads fastened through said housing with their pole pieces protruding therein and a rotatable member with a magnetizable surface record body in the shape of a truncated right circular cone supported by gas lubricated bearing means for rotation within said housing, the method of presetting the air gap clearance between said pole pieces and said magnetizable surface comprising the steps: displacing the rotatable member axially in the direction of its smallest diameter; setting all the transducer heads with their pole pieces in contact with the surface of the magnetizable record body; displacing the rotatable member axially in the direction of its largest diameter until a predetermined air gap has been established between the pole pieces and the magnetizable surface; and further displacing the rotatable member axially of a predetermined quantity for compensating for subsequent axial displacement of said rotatable member due to introduction of pressurized gas into said bearing means previously to operation of said device and for also compensating for subsequent expansion of said rotatable member due to centrifugal and thermal growth during operation of said device.

References Cited in the file of this patent

UNITED STATES PATENTS

| | | |
|---|---|---|
| 2,711,934 | Rickermann | June 28, 1955 |
| 2,787,750 | Jones | Apr. 2, 1957 |
| 2,854,298 | Baumeister | Sept. 30, 1958 |
| 2,907,007 | Baker et al. | Sept. 29, 1959 |
| 2,929,671 | Taylor | Mar. 22, 1960 |

OTHER REFERENCES

"Theory and Practice of Lubrication for Engineers" (Fuller), published by John Wiley & Sons, Inc., 1956. (Pages 106, 125, 187, 296, 300 and 304–305 relied on. Copy in Scientific Library.)